Patented July 10, 1951

2,560,423

UNITED STATES PATENT OFFICE 2,560,423

PURIFICATION OF TITANIUM TETRACHLORIDE

Helmut Espenschied, Metuchen, N. J., assignor to National Lead Company, New York, N. Y., a corporation of New Jersey No Drawing. Application April 12, 1949,
Serial No. 87,112

7 Claims. (Cl. 202—57)

This invention relates to the purification of titanium tetrachloride, more specifically it relates to a simple and economical process for purifying the so-called "commercial grade" or "crude" titanium tetrachloride.

Crude titanium tetrachloride, as manufactured and sold as an article of commerce, is a relatively impure product which has a decidedly deep yellow color. This material may be commercially prepared by processes involving the chlorination of titaniferous iron ores or rutile ores and invariably the product is contaminated by various impurities which are likewise chlorinated or are carried over with the titanium values.

The crude titanium tetrachloride is unsuitable as a raw material in various processes which demand high purity, such as in the manufacture of titanium metal, titanium pigments, and other titanium compounds. In these processes the crude titanium tetrachloride must be purified before it can be utilized.

Operational difficulties are usually encountered in prior methods for the purification of titanium tetrachloride because of the type and nature of the treating agents employed. Some of the treating agents are added in large quantities to the titanium tetrachloride which in itself is uneconomical, while other agents form sticky and gummy masses which are inconvenient and not easily handled. Another difficulty sometimes encountered is in the loss of unrecoverable titanium tetrachloride which is retained by the residual treating agent. These and other difficulties are overcome by the process of the present invention.

In its broadest aspects, an object of this invention is to present an improved method for the purification of titanium tetrachloride. A further object is to purify crude titanium tetrachloride in a convenient and economical manner. Another object of the invention is to purify titanium tetrachloride by a process which involves minimum handling losses. These and other objects will become apparent from the following more complete description of this invention.

It has been discovered by the process of this invention that crude titanium tetrachloride may be purified by contacting the crude titanium tetrachloride simultaneously with an alkaline earth hydroxide and at least one compound selected from the group consisting of the hydroxides of the alkali metals, magnesium, aluminum, titanium, and chromium, and subsequently recovering the purified titanium tetrachloride as a condensate.

This application describes and claims a process for purification of crude titanium tetrachloride by contacting the crude titanium tetrachloride simultaneously with an alkaline earth hydroxide excluding magnesium and at least one compound selected from the group consisting of the hydroxides of the alkali metals and magnesium. The process in which crude titanium is purified by contacting with an alkaline earth hydroxide excluding magnesium and at least one compound selected from the group consisting of the hydroxides of aluminum, titanium, and chromium is more particularly described and claimed in copending divisional application Serial No. 175,029, filed July 20, 1950.

It has further been discovered that the crude titanium tetrachloride may be purified in the vapor phase by contacting the crude vapors with the above-identified combination of treating agents and subsequently recovering the purified titanium tetrachloride as a condensate.

This invention contemplates contacting crude titanium tetrachloride with a combination of hydroxide treating agents, at least one treating agent from each of the two groups mentioned above. The treating agents from the two groups must be simultaneously in contact with the crude titanium tetrachloride to obtain the desired purification effect. When the treating agents are used separately or singly, the crude titanium tetrachloride remains in an impure state with no substantial reduction of the impurities present. The simultaneous presence of at least one treating agent from each of the two groups in the present invention results in a synergistic purification effect which cannot be accomplished by the separate or single use of the respective treating agents.

One group of hydroxide treating agents utilized in the instant case consist of the alkaline earth metal hydroxides excluding magnesium. The term "alkaline earth metal hydroxide excluding magnesium" includes hydroxides of calcium, strontium and barium and does not include magnesium, which normally may or may not be considered an alkaline earth metal. The other group of hydroxide treating agents include the following compounds: NaOH, KOH, LiOH and Mg(OH)$_2$.

The quantity of the treating agents used is directly dependent upon the type of starting material employed. It is obvious that the more impurities present in the crude titanium tetrachloride, the greater the quantity of treating agents required for their removal. A typical example of the range of treating agents necessary for the removal of impurities, such as vanadium and silica, from a crude titanium tetrachloride is as follows:

A particular sample of crude titanium tetrachloride contains 0.06% $SiO_2$ and 0.004% vanadium. With this type of starting material, the sum of the treating agents required for purification is from about 0.5% to 2.0%, preferably from about 1.0% to 1.5% based on the weight of the crude titanium tetrachloride. With a crude titanium tetrachloride containing more impurities than those present in the example cited above, additional quantities of treating agents must be added. In extreme cases when using a crude titanium tetrachloride which contains exceptionally large amounts of impurities, it may be necessary to add up to about 10% of combined treating agents based on the weight of the crude titanium tetrachloride to obtain an effective removal of the impurities.

As previously stated, a combination of treating agents must be used instead of a single treating agent. With respect to the required proportions of the respective agents used in the combination, it has been found that effective results are obtained if from ⅓ part to 3 parts, preferably ½ part to 2 parts, of the alkaline earth hydroxides are selected for each part of the second group consisting of the hydroxides of the alkali metals and magnesium, however; when badly contaminated crude titanium tetrachloride is used, which necessitates the use of large quantities of the combination of treating agents, from 1/16 part to 10 parts of the alkaline earth hydroxides may be selected for each part of the second group.

According to the preferred embodiment of this invention, the crude titanium tetrachloride is contacted simultaneously with a small quantity of the treating agents. The treated titanium tetrachloride is heated to boiling and distilled to obtain a purified titanium tetrachloride condensate. By the process of this invention the crude titanium tetrachloride is converted from an unsuitable material to a commercially acceptable product. The purified product possesses a water-white color.

Many of the prior art purification methods require extended refluxing periods before the added treating agents have had sufficient time to take effect, but according to this invention the only time required is that of heating the liquid in the presence of the treating agents to the boiling temperature and during the subsequent distilling operation to obtain a purified product.

The combination of purifying treating agents used in the process of this invention remain substantially in suspension and in finely-divided form in the liquid titanium tetrachloride and therefore mechanical agitation is not essential. These treating agents do not stick to the walls of the still and since they are added in small quantities, the still bottoms comprise a small non-sticky loose mass which may be easily removed from the still. With this type of still bottom, the handling loss of the titanium tetrachloride is held to a minimum.

To further illustrate this invention the following examples are presented:

Example 1

1000 grams of crude titanium tetrachloride were placed in a glass distilling flask. 0.8% of calcium hydroxide and 0.8% of sodium hydroxide based on weight of the titanium tetrachloride were added to the titanium tetrachloride at room temperature. The mixture was then rapidly heated to boiling and distilled at normal pressure out of contact with the outside atmosphere. The distillate was condensed and analyzed. The entire procedure was carried out in glass apparatus to prevent contamination. The purified titanium tetrachloride possessed a water-white color. The analytical data are presented in Table I.

Example II

Example I was repeated using 0.5% of barium hydroxide and 0.5% of magnesium hydroxide as treating agents. Again the product was water-white. The data are presented in Table I.

Substantially equal results to those shown in Table I were obtained using calcium hydroxide in combination with other alkali metal hydroxides.

TABLE I

| Example No. | Percent Treating Agents Added | Color | Impurities in Distillate | |
|---|---|---|---|---|
| | | | Percent $SiO_2$ | Percent V |
| I | 1.6% $Ca(OH)_2$+NaOH | Water-white | .008 | .0008 |
| II | 1.0% $Ba(OH)_2$+$Mg(OH)_2$ | do | .017 | .0008 |
| Untreated Crude Ti $Cl_4$ | | Yellow | .06 | .004 |

Purifications of the crude titanium tetrachloride also were carried out in the vapor phase by contacting crude titanium tetrachloride vapors with a heated bed containing these combinations of treating agents. The temperatures of the treating agents utilized in these purifications should be maintained below the normal decomposition temperatures of the respective treating agents.

Example of the vapor phase purifications is presented as follows:

Example III 1000 grams of the same crude titanium tetrachloride were vaporized and the vapors were allowed to contact a bed of a combination of treating agents heated to 300° C.; the combination of treating agents consisted of 1.4% of calcium hydroxide and 0.5% of magnesium hydroxide. The purified product was then condensed and analyzed. The product was water-white in color and contained <0.008% vandium.

Hence, it is evident that crude titanium tetrachloride purified by the process of this invention will be converted to a water-white product. The impurities particularly vanadium have been eliminated to the extent that the purified titanium tetrachloride becomes a commercially acceptable product. It has further been shown that the process is convenient and economical because the combination of treating agents used are inexpensive, they are added in small quantities, and they do not form sticky or bulky still bottoms. The finely-divided and non-sticky treating agent mass may be easily removed from the still. The titanium tetrachloride removed from the treating agent mass is easily recovered from the mass by heating and is returned to the system. The ability to heat the treating agents without sticking to the walls of the vessels and without retaining an appreciable amount of titanium tetrachloride in the residual treating agents result in minimizing the titanium tetrachloride handling losses of the process.

This invention has been described in connection with certain details of operation and specific examples; but it is however not intended that such description and examples shall be interpreted as imposing limitation upon the scope insofar as they are not included in the accompanying claims.

I claim:

1. A method for the purification of titanium tetrachloride which comprises contacting, at a temperature at least as high as the boiling point of titanium tetrachloride, crude titanium tetrachloride simultaneously with an alkaline earth hydroxide excluding magnesium and at least one coompound selected from the group consisting of the hydroxides of the alkali metals and magnesium, and subsequently recovering the purified titanium tetrachloride as a condensate.

2. The method according to claim 1 in which the sum of the treating agents is present in amount from 0.5% to 10% of the weight of the titanium tetrachloride.

3. The method according to claim 2 in which from 1/3 part to 3 parts of said alkaline earth metal hydroxide are present for each part of the compound selected from the hydroxides of the alkali metals and magnesium,.

4. A method for the purification of titanium tetrachloride which comprises contacting, at a temperature at least as high as the boiling point of titanium tetrachloride, liquid crude titanium tetrachloride simultaneously with an alkaline earth metal hydroxide excluding magnesium and at least one compound selected from the group consisting of the hydroxides of the alkali metals and magnesium, and subsequently distilling and recovering the purified titanium tetrachloride as a condensate.

5. A method for the purification of titanium tetrachloride which comprises contacting crude titanium tetrachloride vapors simultaneously with an alkaline earth metal hydroxide excluding magnesium and at least one compound selected from the group consisting of the hydroxides of the alkali metals and magnesium, and subsequently recovering the purified titanium tetrachloride as a condensate.

6. A method for the purification of titanium tetrachloride which comprises contacting, at a temperature at least as high as the boiling point of titanium tetrachloride, crude titanium tetrachloride simultaneously with an alkaline earth metal hydroxide, excluding magnesium, and an alkali metal hydroxide, and subsequently recovering the purified titanium tetrachloride as a condensate.

7. A method for the purification of titanium tetrachloride which comprises contacting, at a temperature at least as high as the boiling point of titanium tetrachloride, crude titanium tetrachloride simultaneously with an alkaline earth metal hydroxide, excluding magnesium, and magnesium hydroxide, and subsequently recovering the purified titanium tetrachloride as a condensate.

HELMUT ESPENSCHIED.

REFERENCES CITED

The following references are of record in the file of this patent:

UNITED STATES PATENTS

| Number | Name | Date |
| --- | --- | --- |
| 2,207,597 | Pechukas | July 9, 1940 |
| 2,396,458 | Cole | Mar. 12, 1946 |
| 2,416,191 | Meister | Feb. 18, 1947 |

OTHER REFERENCES

Briscoe "General Chemistry for Colleges," published 1938 by the Houghton Mifflin Company, Boston, Mass. Copy in Library of Congress, pages 756 and 757.